(12) United States Patent
Lin

(10) Patent No.: US 8,100,025 B2
(45) Date of Patent: Jan. 24, 2012

(54) ROLLING ELEMENT RETAINER

(75) Inventor: Ming-Yao Lin, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 637 days.

(21) Appl. No.: 12/276,519

(22) Filed: Nov. 24, 2008

(65) Prior Publication Data

US 2010/0129012 A1    May 27, 2010

(51) Int. Cl.
*F16C 27/00* (2006.01)
*F16C 29/06* (2006.01)

(52) U.S. Cl. .................. 74/424.88; 384/37

(58) Field of Classification Search ........... 74/424.81, 74/424.82, 424.86–424.88; 384/43–45, 51, 384/521, 523, 528
See application file for complete search history.

(56) References Cited

U.S. PATENT DOCUMENTS

| | | | | |
|---|---|---|---|---|
| 3,292,981 A * | 12/1966 | Zaugg | ............ | 384/527 |
| 4,844,628 A * | 7/1989 | Knappe | ............ | 384/510 |
| 5,156,462 A * | 10/1992 | Jacob et al. | ............ | 384/49 |
| 5,993,064 A * | 11/1999 | Teramachi et al. | ............ | 384/43 |
| 6,668,673 B2 * | 12/2003 | Hsu | ............ | 74/424.88 |
| 6,813,968 B2 * | 11/2004 | Miyaguchi et al. | ............ | 74/424 |
| 2002/0078775 A1 * | 6/2002 | Akido | ............ | 74/424.88 |
| 2005/0109143 A1 * | 5/2005 | Miyaguchi et al. | ......... | 74/424.81 |
| 2005/0175264 A1 * | 8/2005 | Kim et al. | ............ | 384/51 |
| 2006/0133707 A1 * | 6/2006 | Hanada et al. | ............ | 384/523 |
| 2007/0160313 A1 * | 7/2007 | Kuo et al. | ............ | 384/51 |
| 2008/0000320 A1 | 1/2008 | Osterlaenger et al. | | |

* cited by examiner

*Primary Examiner* — Raymond W Addie

(57) ABSTRACT

A rolling element retainer is provided with two through rolling element retaining spaces. Each of the rolling elements retaining spaces is provided for accommodation of one rolling element. The rolling element retainer is provided with a linking portion at each of two opposite sides thereof. The rolling element retainer is further provided with a rolling element rolling channel in each of two external end surfaces thereof. The angular difference between the respective rolling element rolling channels and the respective linking portions is 0 degree or 90 degrees. By such arrangements, the rolling channels at two ends of the rolling element retainer are provided for contact with the rolling elements therebetween, so as to guide the movement of such rolling elements.

8 Claims, 10 Drawing Sheets

ROLLING ELEMENT RETAINER

BACKGROUND OF THE INVENTION

1. Field of the Invention

The present invention relates to a rolling element retainer for a linear displacement apparatus, and more particularly to a rolling element retainer which is disposed between a slide rail and a movable platform and circulates therein to support and move the movable platform.

2. Description of the Prior Art

Commonly, a linear guideway is provided with a movable platform on a slide rail, in order to lower friction and reduce noise, between the slide rail and the movable platform is provided a circulation passage for accommodation of rolling elements, which are commonly balls. Since the rolling elements keep colliding with and rubbing against each other while rolling within the circulation passage, the service life of the rolling elements is greatly reduced. Therefore, a rolling element retainer was developed to limit the position of the respective rolling elements, for example, the ball retainer disclosed in US Pat. No. 2008/0000320A1. This conventional ball retainer is formed with two ball retaining portions disposed at two sides thereof for holding the ball, and a disc on each of its two axial ends. The discs at the two axial ends of one ball retainer are used to insure a smooth contact with another ball retainer while the ball retainers return, so as to reduce abrasion and interference. Nevertheless, neither of the two contacting ball retainers is rotatable, and no ball is disposed between the two contacting ball retainers, therefore, the rolling smoothness and noise problem are still to be improved. Additionally, if the two contacting rolling element retainers are provided with one ball therebetween, it will be impossible to retain the ball, and the balls between the two contacting ball retainers may have difficulty in smoothly passing through the return portion of the circulation passage.

The present invention has arisen to mitigate and/or obviate the afore-described disadvantages.

SUMMARY OF THE INVENTION

The technical problems to be solved:

Although the conventional rolling element retainer with two rolling element retaining spaces can successfully retain two rolling elements, neither of the two contacting ball retainers is rotatable, and no ball is disposed between the two contacting ball retainers, so that the rolling smoothness and noise problems are still to be improved, and if the two contacting rolling element retainers are provided with one rolling element therebetween, the rolling elements between the two contacting ball retainers may have difficulty in smoothly passing through the return portion of the circulation passage.

The technical features for solving the above technical problems:

In order to solve the above technical problems, the present invention provides a rolling element retainer which is provided with a central retaining portion, two side retaining portions disposed at two sides of the central retaining portion, and two linking portions linking the central retaining portion with the side retaining portions. The height of the central retaining portion is the same as that of the respective linking portions, and the central retaining portion, the side retaining portions and the linking portions define two retaining spaces. Each of the retaining spaces is provided for accommodation of one rolling element. Each of the side retaining portions is provided with a rolling channel in an external end surface thereof. The angular difference between the respective channels and the respective linking portions is 0 degree or 90 degrees. By such arrangements, the rolling element retainer of the present invention can cooperate with rolling elements to roll endlessly within a circulation path.

As compared with the prior art, the present invention has the following advantages:

The primary objective of the present invention is that when the respective rolling element retainers move, the rolling element rolling channels at two ends of the respective rolling element retainers are in contact with one rolling element, so that there is almost no clearance in the circulation path, thus reducing noise and improving the smoothness of movement. Furthermore, when the rolling elements between two rolling element retainers return, the rolling element rolling channels are used to contact and press against these rolling elements so as to guide them, so that the respective rolling element retainers and the respective rolling elements can move along the predetermined optimal path, without causing the occurrence of the undesired path deviation, thus further improving the smoothness of movement.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
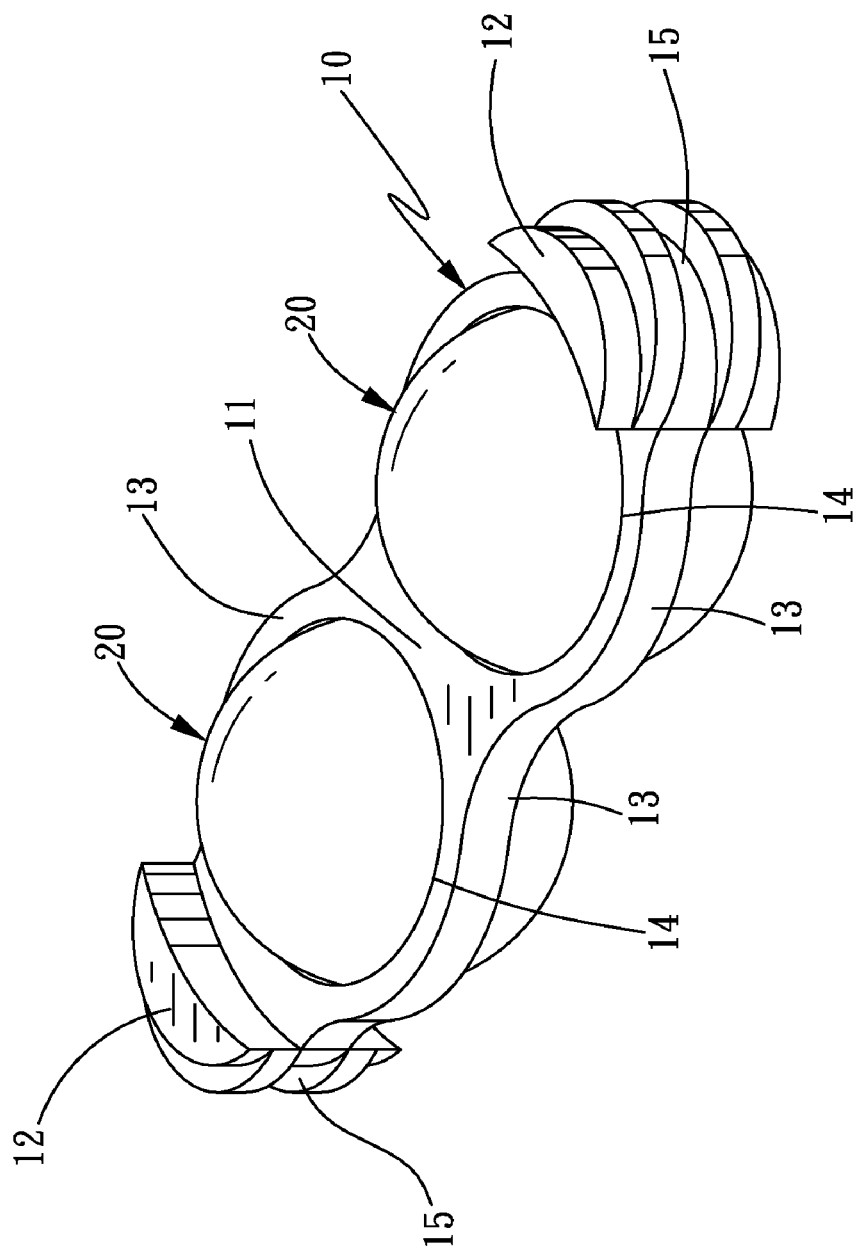
FIG. 1 is a perspective view of a rolling element retainer in accordance with a first embodiment of the present invention.
Figure 2:
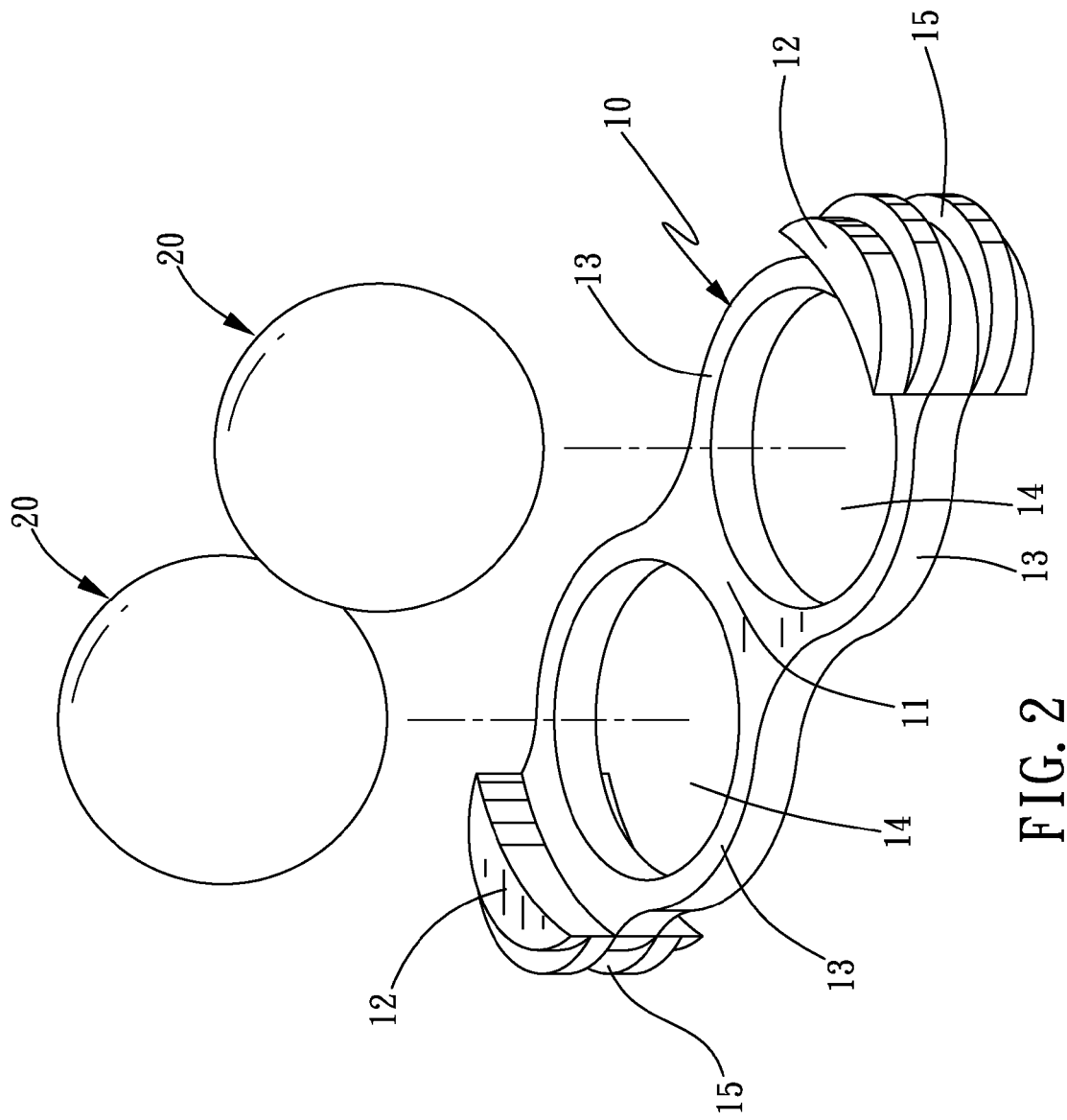
FIG. 2 is an exploded view of the rolling element retainer in accordance with the first embodiment of the present invention.

Referring to FIGS. 1-2, a retainer 10 in accordance with a first embodiment of the present invention is provided for accommodation of two rolling elements 20.

The retainer 10 is provided with a central retaining portion 11, two side retaining portions 12 disposed at two sides of the central retaining portion 11, and two linking portions 13 linking the central retaining portion 11 with the two side retaining portions 12. The height of the central retaining portion 11 is the same as that of the respective linking portions 13, and the central retaining portion 11, the side retaining portions 12 and the linking portions 13 define two retaining spaces 14. Each of the two retaining spaces 14 is provided for accommodation of one rolling element 20. Each of the side retaining portions 12 is provided with a rolling channel 15 in its external end surface, and an angular difference between the respective rolling channels 15 and the respective linking portions 13 is 0 degree.

Figure 3:
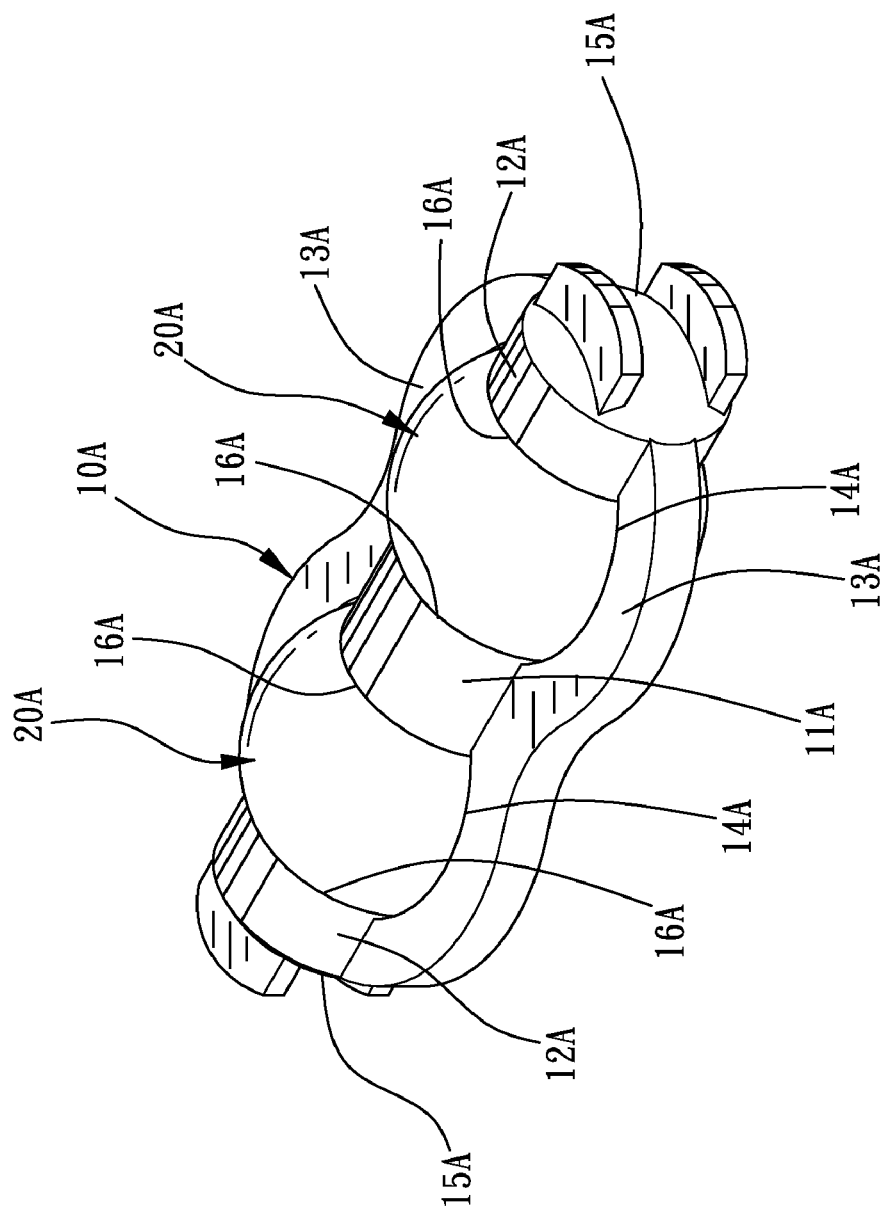
FIG. 3 is a perspective view of a rolling element retainer in accordance with a second embodiment of the present invention.
Figure 4:
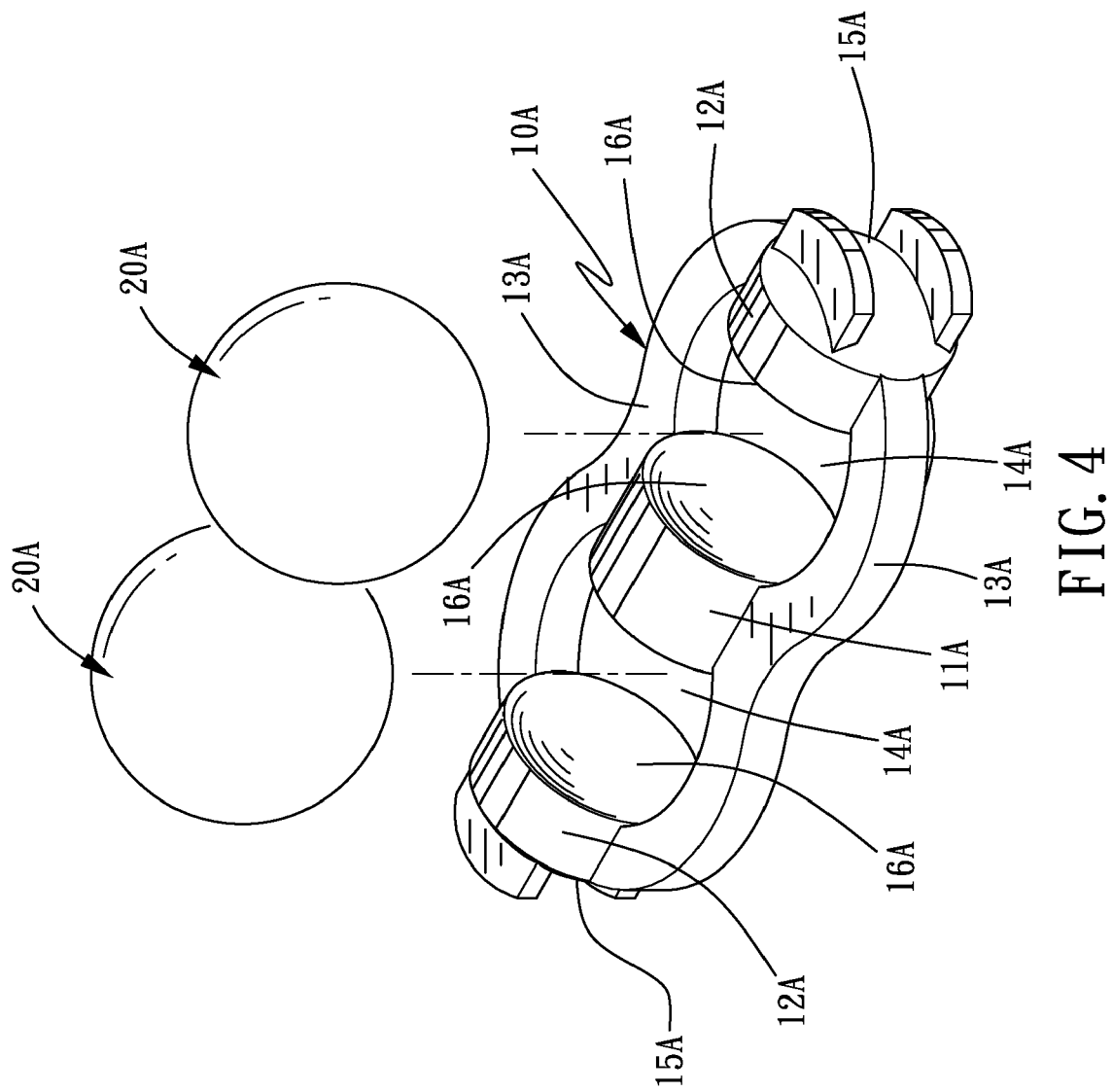
FIG. 4 is an exploded view of the rolling element retainer in accordance with the second embodiment of the present invention.

Referring to FIGS. 3-4, a retainer 10A in accordance with a second embodiment of the present invention is provided for accommodation of two rolling elements 20A.

The retainer 10A is provided with a central retaining portion 11A, two side retaining portions 12A disposed at two sides of the central retaining portion 11A, and two linking portions 13A linking the central retaining portion 11A with the two side retaining portions 12A. The height of the central retaining portion 11A is the same as that of the respective linking portions 13A, and the central retaining portion 11A, the side retaining portions 12A and the linking portions 13A define two retaining spaces 14A. Each of the two retaining spaces 14A is provided for accommodation of one rolling element 20A. Each of the side retaining portions 12A is provided with a rolling channel 15A in its external end surface, and the angular difference between the respective rolling channels 15A and the respective linking portions 13A is 0 degree. Two sides of the central retaining portion 11A and one side of the respective side retaining portions 12A are each provided with a concave retaining surface 16A.

Figure 5:
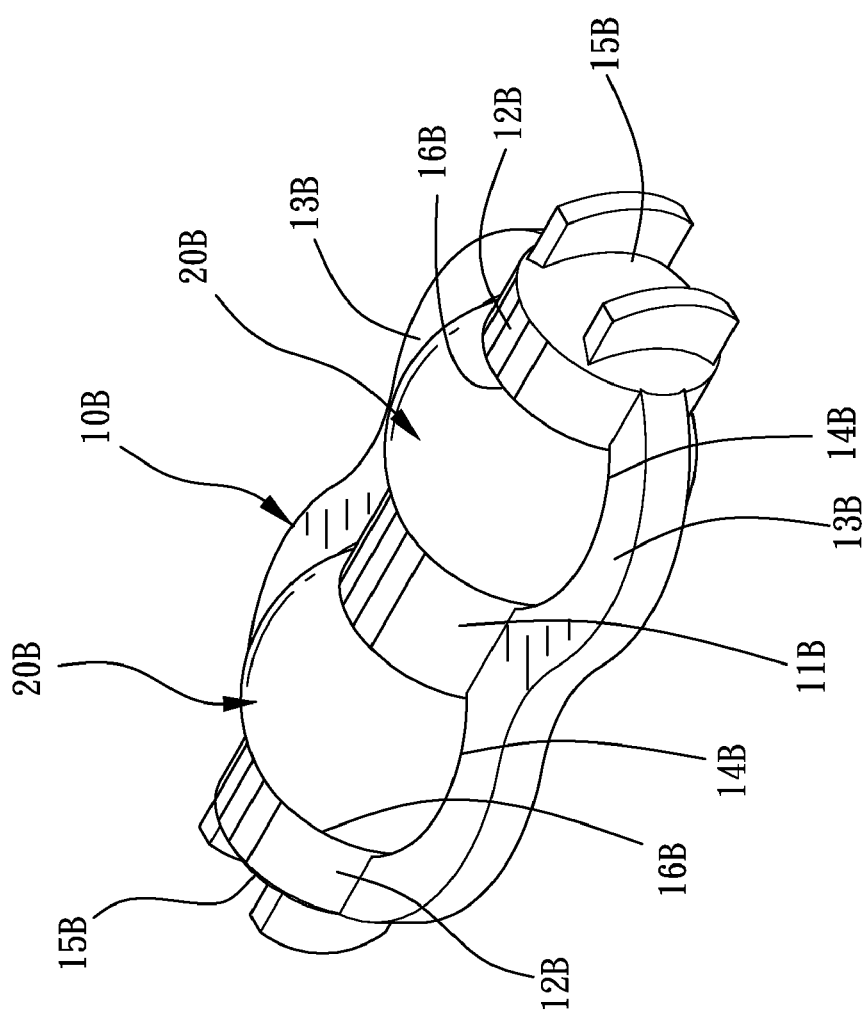
FIG. 5 is a perspective view of a rolling element retainer in accordance with a third embodiment of the present invention.

Referring to FIG. 5, a retainer 10B in accordance with a third embodiment of the present invention is provided for accommodation of two rolling elements 20B.

The retainer 10B is provided with a central retaining portion 11B, two side retaining portions 12B disposed at two sides of the central retaining portion 11B, and two linking portions 13B linking the central retaining portion 11B with the two side retaining portions 12B. The height of the central retaining portion 11B is the same as that of the respective linking portions 13B, and the central retaining portion 11B, the side retaining portions 12B and the linking portions 13B define two retaining spaces 14B. Each of the two retaining spaces 14B is provided for accommodation of one rolling element 20B. Each of the side retaining portions 12B is provided with a rolling channel 15B in its external end surface, and the angular difference between the respective rolling channels 15B and the respective linking portions 13B is 90 degrees. Two sides of the central retaining portion 11A and one side of the respective side retaining portions 12A are each provided with a concave retaining surface 16B.

Figure 6:
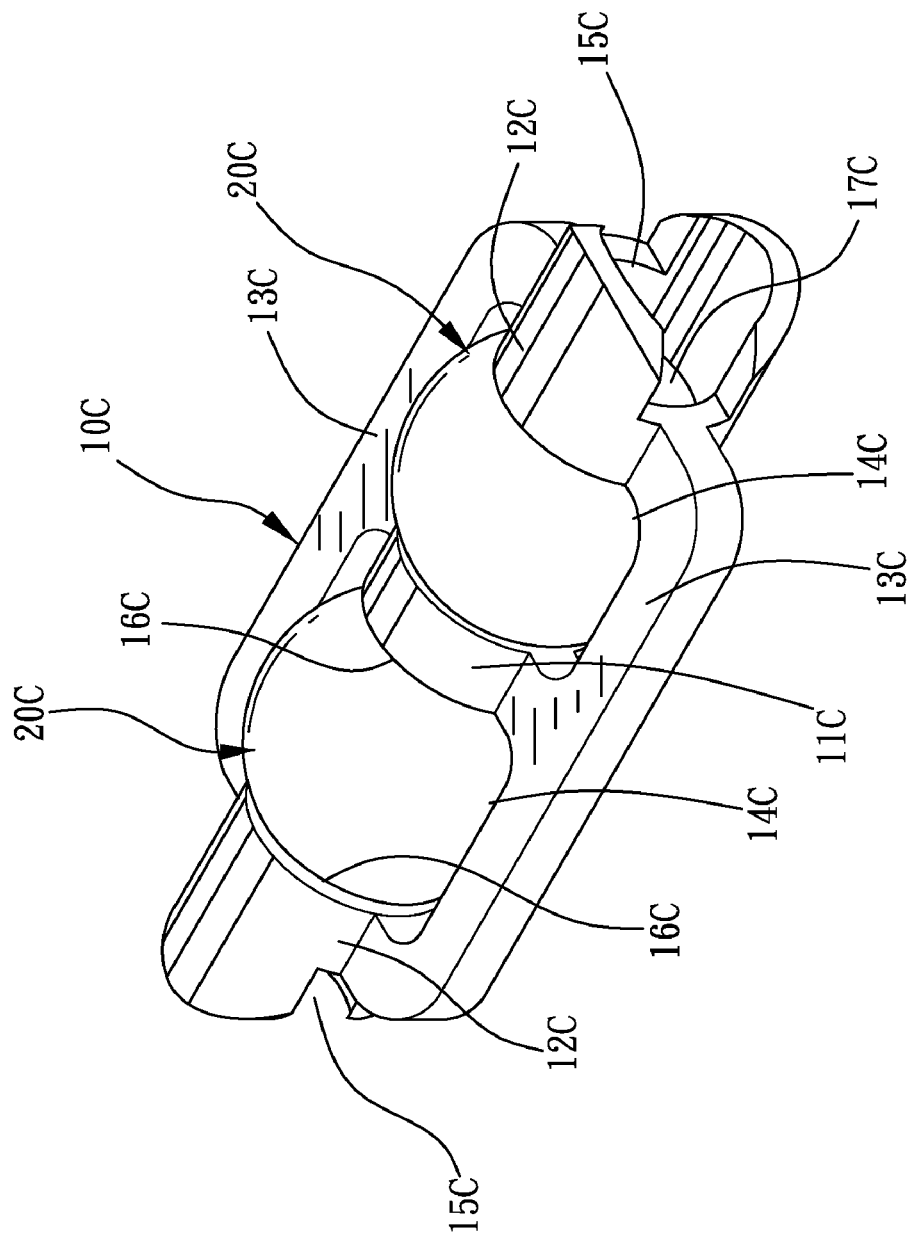
FIG. 6 is a perspective view of a rolling element retainer in accordance with a fourth embodiment of the present invention.
Figure 7:
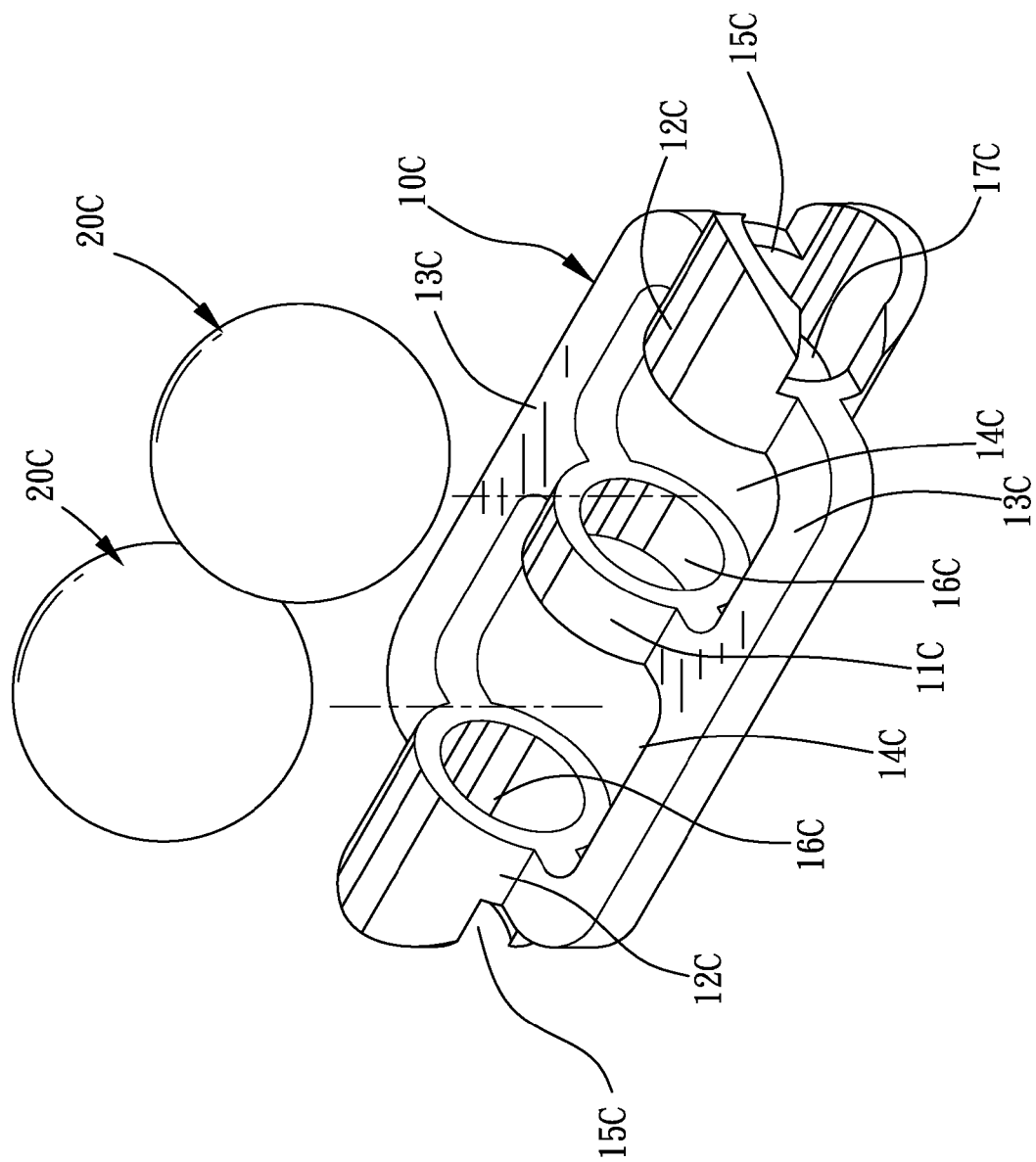
FIG. 7 is an exploded view of the rolling element retainer in accordance with the fourth embodiment of the present invention.

Referring to FIGS. 6-7, a retainer 10C in accordance with a fourth embodiment of the present invention is provided for accommodation of two rolling elements 20C.

The retainer 10C is provided with a central retaining portion 11C, two side retaining portions 12C at two sides of the central retaining portion 11C, and two linking portions 13C linking the central retaining portion 11C with the two side retaining portions 12C. The height of the central retaining portion 11C is the same as that of the respective linking portions 13C, and the central retaining portion 11C, the side retaining portions 12C and the linking portions 13C define two retaining spaces 14C. Each of the two retaining spaces 14C is provided for accommodation of one rolling element 20C. Each of the side retaining portions 12C is provided with a rolling channel 15C in its external end surface, and the angular difference between the respective rolling channels 15C and the respective linking portions 13C is 0 degree. Two sides of the central retaining portion 11C and one side of the respective side retaining portions 12C are each provided with a concave retaining surface 16C. Additionally, the central retaining portion 11C and the side retaining portions 12C each are defined with a through hole 17C, 16C.

Figure 8:
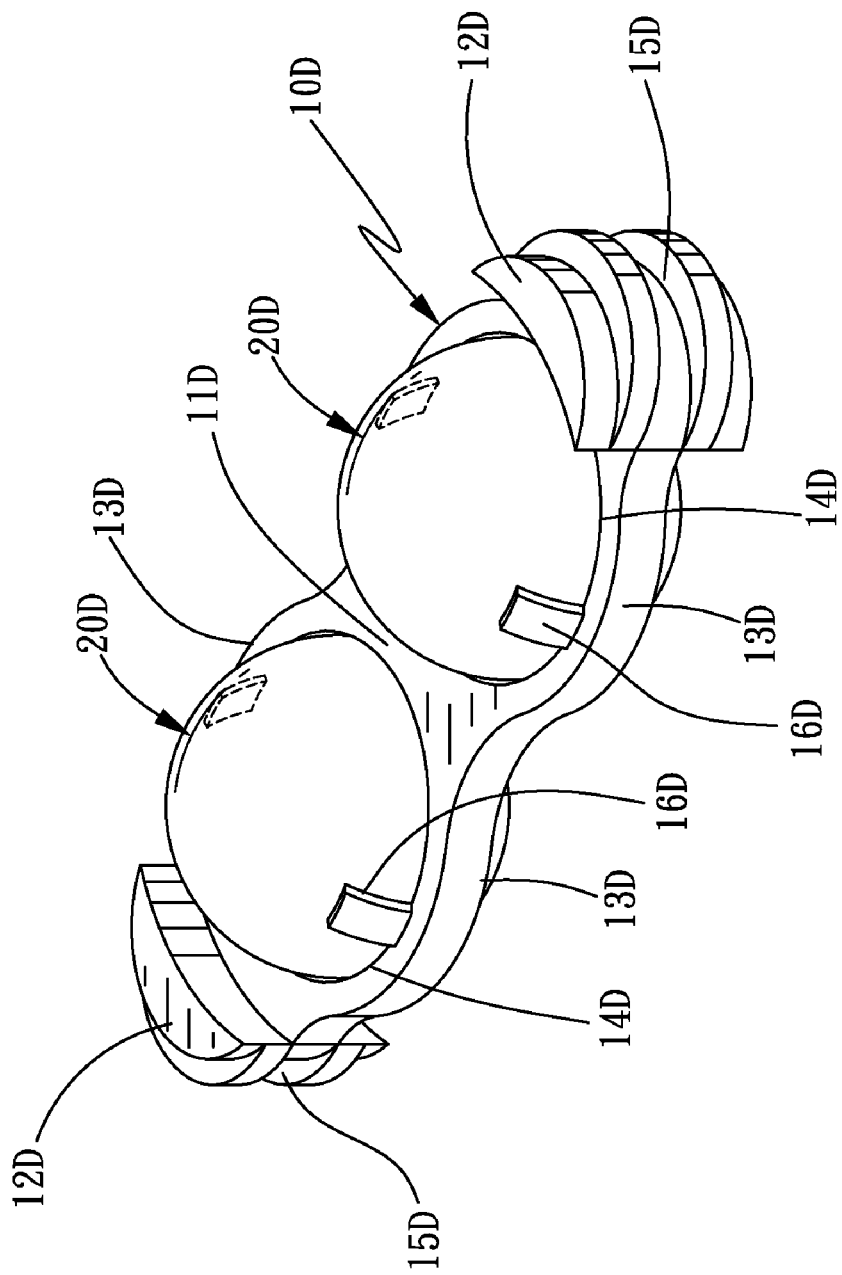
FIG. 8 is a perspective view of a rolling element retainer in accordance with a fifth embodiment of the present invention.
Figure 9:
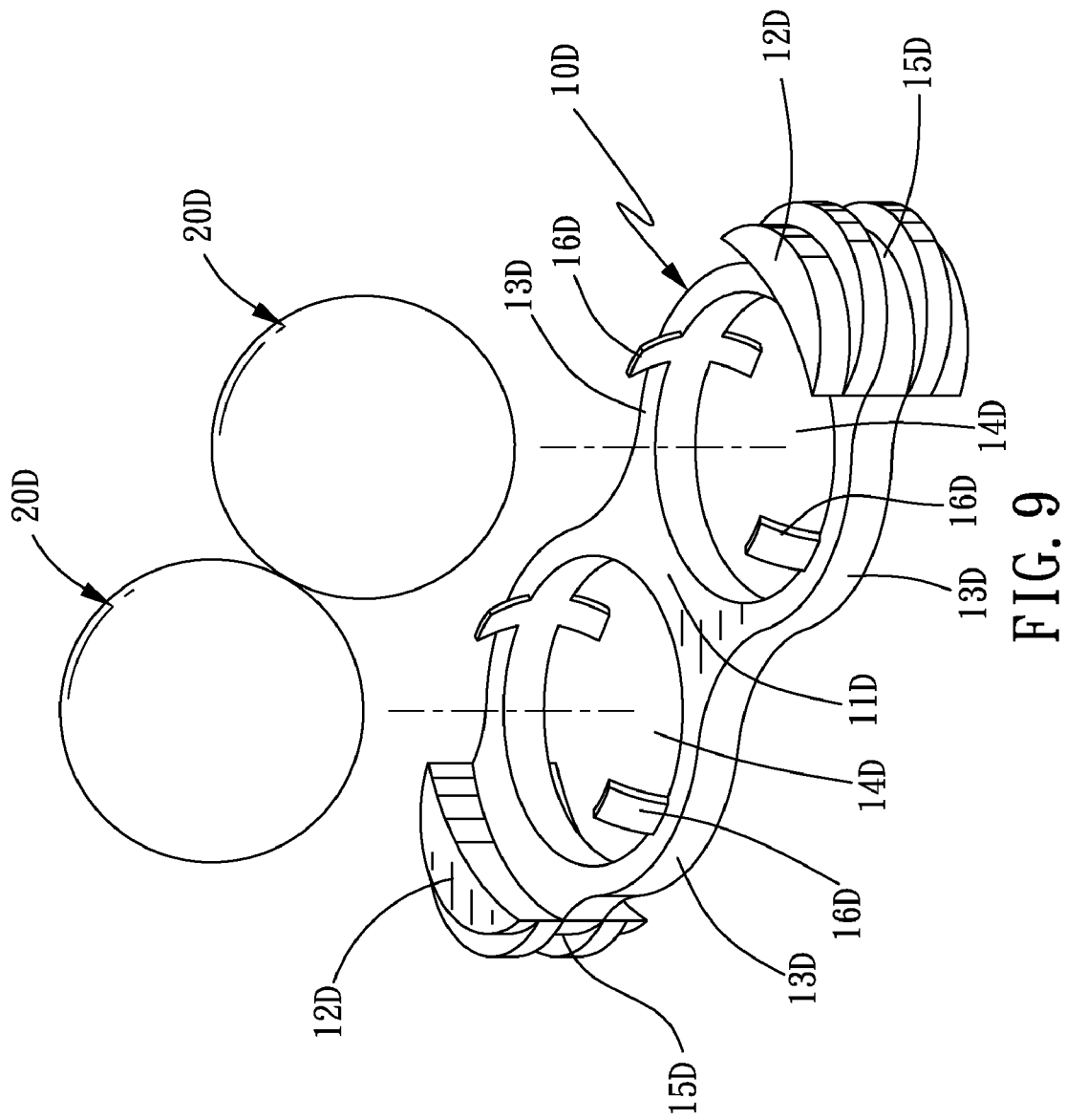
FIG. 9 is an exploded view of the rolling element retainer in accordance with the fifth embodiment of the present invention.

Referring to FIGS. 8-9, a retainer 10D in accordance with a fifth embodiment of the present invention is provided for accommodation of two rolling elements 20D.

The retainer 10D is provided with a central retaining portion 11D, two side retaining portions 12D disposed at two sides of the central retaining portion 11D, and two linking portions 13D linking the central retaining portion 11D with the two side retaining portions 12D. The height of the central retaining portion 11D is the same as that of the respective linking portions 13D, and the central retaining portion 11D, the side retaining portions 12D and the linking portions 13D define two retaining spaces 14D. Each of the two retaining spaces 14D is provided for accommodation of one rolling element 20D. Each of the side retaining portions 12D is provided with a rolling channel 15D in its external end surface, and the angular difference between the respective rolling channels 15D and the respective linking portions 13D is 0 degree. Additionally, the central retaining portion 11D, the side retaining portions 12D or the linking portions 13D are each provided with stopping blocks 16D for retaining the rolling elements 20D.

Figure 10:
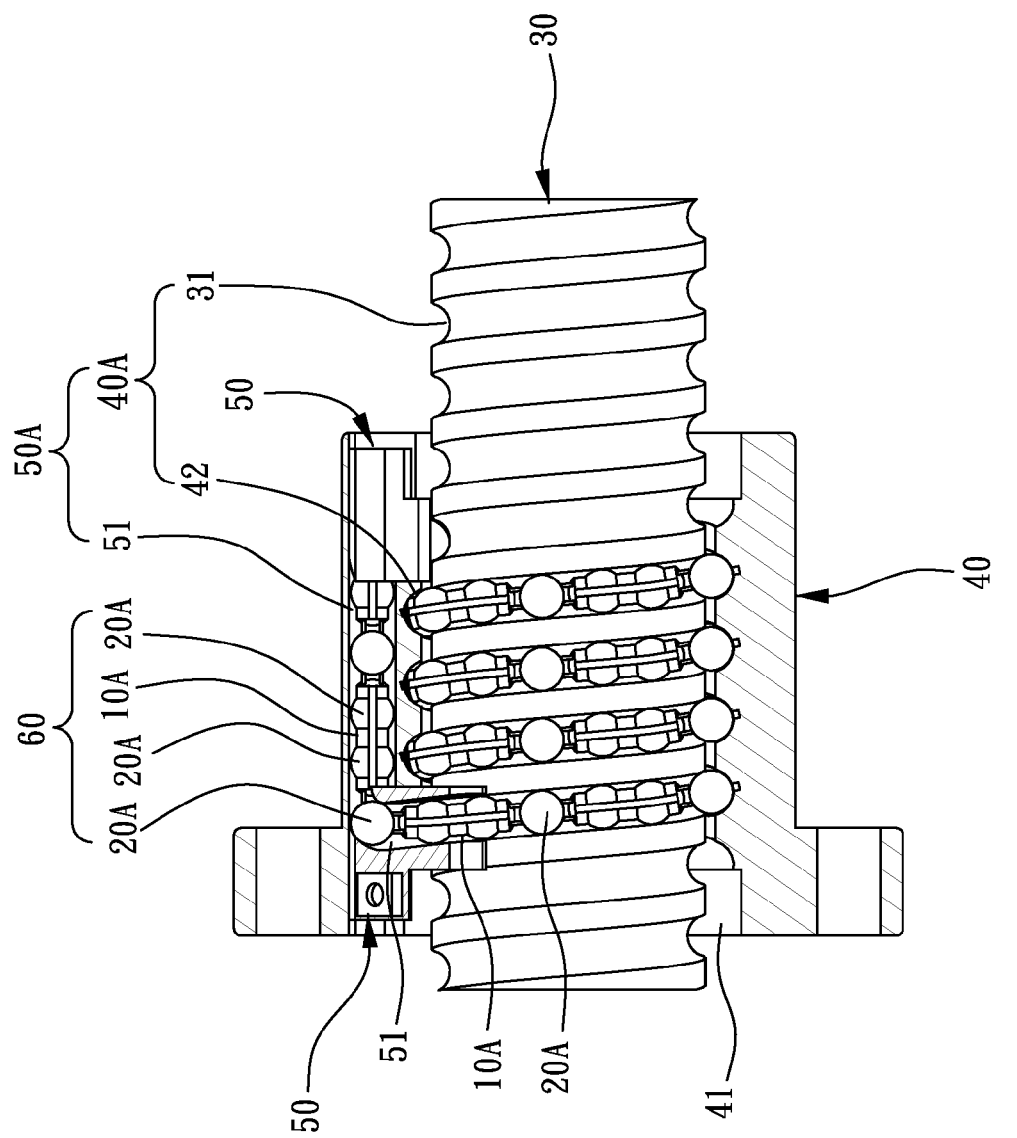
FIG. 10 is a cross sectional view illustrating that how the rolling element retainer in accordance with the present invention roll within the circulation path.

When in use, referring to FIGS. 3-4 again together with FIG. 10, a ball screw with the rolling element retainer of the present invention comprises a shaft 30, a nut 40, a return element 50, and a rolling module 60.

The shaft 30 is provided with a helical channel 31 in its outer circumferential surface.

The nut 40 is provided with a through hole 41 for insertion of the shaft 30, and the through hole 41 is provided in its inner circumferential surface with a helical groove 42 opposite the helical channel 31. The helical channel 31 and the helical groove 42 define a loaded path 40A.

The return element 50 is mounted on the nut 40 and provided with a return passage 51. The return passage 51 is linked up with the loaded path 40A to form a complete circulation path 50A.

The rolling module 60 is disposed within the circulation path 50A and includes plural retainers 10A and plural rolling elements 20A. Each of the retainers 10A is provided with a central retaining portion 11A, two side retaining portions 12A disposed at two sides of the central retaining portion 11A, and two linking portions 13A linking the central retaining portion 11A with the two side retaining portions 12A. The central retaining portion 11A, the side retaining portions 12A and the linking portions 13A define two retaining spaces 14A, and each of the two retaining spaces 14A is provided for accommodation of one rolling element 20A. Each of the side retaining portions 12A is provided with a rolling channel 15A in its external end surface. When the plural retainers 10A are disposed in the circulation path 50A, the opposite rolling channels 15A of every pair of retainers 10A is provided with another rolling element 20A therebetween.

Further analysis of the above structures shows that the present invention has the following advantages:

When the respective rolling element retainers 10 (10A, 10B, 10C or 10D) move, the rolling element rolling channels 15 (15A, 15B, 15C or 15D) at two ends of the respective rolling element retainers 10 are in contact with one rolling element 20 (20A, 20B, 20C or 20D), so that there is almost no clearance in the circulation path 20A, thus reducing noise and improving the smoothness of movement. Furthermore, when the rolling elements 20 (20A, 20B, 20C or 20D) return (namely, pass through the return portion of the circulation path), the rolling element rolling channels 15 (15A, 15B, 15C or 15D) are used to contact and press against the rolling elements 20 (20A, 20B, 20C or 20D) to guide the movement of the rolling elements 20 (20A, 20B, 20C or 20D), so that the respective rolling element retainers 10 (41A, 10B, 10C or 10D) and the respective rolling elements 20 (20A, 20B, 20C or 20D) can move along the predetermined optimal path, without causing the occurrence of the undesired path deviation, thus further improving the smoothness of movement.

While we have shown and described various embodiments in accordance with the present invention, it is clear to those skilled in the art that further embodiments may be made without departing from the scope of the present invention.

What is claimed is:

1. A ball screw with rolling element retainers comprising:
a shaft provided with a helical channel in an outer circumferential surface thereof;
a nut provided with a through hole for insertion of the shaft, the through hole being provided in an inner circumferential surface thereof with a helical groove opposite the helical channel, the helical channel and the helical groove defining a circulation passage; and
a rolling module disposed in the circulation path, the rolling module including plural retainers and rolling elements, each of the retainers being provided with a central retaining portion, two side retaining portions disposed at two sides of the central retaining portion, and two linking portions linking the central retaining portion with the two side retaining portions, the central retaining portion, the side retaining portions and the linking portions defining two retaining spaces, each of the retaining spaces being provided for accommodation of one rolling element, each of the side retaining portions being provided with a rolling channel on an external end surface thereof;
the ball screw with rolling element retainers is characterized in that: between every such two rolling element retainers is disposed another rolling element, and when the respective rolling element retainers move, the another elements is confined in a space defined by the rolling channels at two ends of the respective rolling element retainers, so as to prevent the respective rolling element retainers from impacting one another, and consequently reducing the noise and vibration produced during movement of the ball screw.

2. The ball screw with rolling element retainers as claimed in claim 1, wherein an angular difference between the respective rolling channels and the respective linking portions is 90 degrees.

3. The ball screw with rolling element retainers as claimed in claim 1, wherein the angular difference between the respective rolling channels and the respective linking portions is 0 degree.

4. The ball screw with rolling element retainers as claimed in claim 1, wherein a height of the central retaining portion is the same as that of the respective linking portions.

5. The ball screw with rolling element retainers as claimed in claim 1, wherein two sides of the central retaining portion and one side of the respective side retaining portions are each provided with a concave retaining surface.

6. The ball screw with rolling element retainers as claimed in claim 1, wherein the central retaining portion and the side retaining portions are each defined with a through hole.

7. The ball screw with rolling element retainers as claimed in claim 4, wherein the linking portions are each provided with a stopping block for retaining the rolling elements.

8. The ball screw with rolling element retainers as claimed in claim 4, wherein the central retaining portion and the side retaining portions are each provided with a stopping block for retaining the rolling elements.

* * * * *